(12) United States Patent
Audigie et al.

(10) Patent No.: US 9,763,374 B2
(45) Date of Patent: Sep. 19, 2017

(54) SOWING MACHINE WITH A DISTRIBUTION BOX HAVING EJECTION POINT ADJACENT OPEN FURROW

(71) Applicant: KUHN SA, Saverne (FR)

(72) Inventors: Jean-Charles Audigie, Bouxwiller (FR); Julien Eberhart, Veckersviller (FR)

(73) Assignee: KUHN SA, Saverne (FR)

( * ) Notice: Subject to any disclaimer, the term of this patent is extended or adjusted under 35 U.S.C. 154(b) by 38 days.

(21) Appl. No.: 14/766,668

(22) PCT Filed: Jan. 16, 2014

(86) PCT No.: PCT/FR2014/050088
§ 371 (c)(1),
(2) Date: Aug. 7, 2015

(87) PCT Pub. No.: WO2014/122377
PCT Pub. Date: Aug. 14, 2014

(65) Prior Publication Data
US 2015/0373898 A1 Dec. 31, 2015

(30) Foreign Application Priority Data
Feb. 7, 2013 (FR) ...................................... 13 51055

(51) Int. Cl.
*A01C 5/06* (2006.01)
*A01C 7/04* (2006.01)
(Continued)

(52) U.S. Cl.
CPC .............. *A01B 49/06* (2013.01); *A01C 5/064* (2013.01); *A01C 7/04* (2013.01); *A01C 7/046* (2013.01); *A01C 7/128* (2013.01); *A01C 7/20* (2013.01)

(58) Field of Classification Search
CPC .......... A01C 5/064; A01C 7/046; A01B 49/06
(Continued)

(56) References Cited

U.S. PATENT DOCUMENTS 3,888,387 A    6/1975  Deckler
3,913,503 A *  10/1975 Becker .................... A01C 7/04
                                                      111/171

(Continued)

FOREIGN PATENT DOCUMENTS

EP   2 514 291 A2   10/2012
FR   2 247 150 A1    5/1975
GB   2 000 422 A     1/1979

OTHER PUBLICATIONS

International Search Report Issued May 26, 2014 in PCT/FR14/050088 Filed Jan. 16, 2014.

*Primary Examiner* — John G Weiss
(74) *Attorney, Agent, or Firm* — Oblon, McClelland, Maier & Neustadt, L.L.P.

(57) ABSTRACT

A single-grain seeder including a chassis that supports at least one seeding element including a dispensing housing, at least one opening disk for opening a furrow in the ground, and at least one depth control wheel, the dispensing housing delivering seeds one by one via a rotary dosing element configured to turn about a rotation axis, each seed being ejected from the rotary dosing element at an ejection point extending in a lower portion of the rotary dosing element. The ejection point is disposed in an external diameter of the opening disk, when viewed along the rotation axis of the rotary dosing element.

16 Claims, 4 Drawing Sheets

(51) Int. Cl.
*A01B 49/06* (2006.01)
*A01C 7/20* (2006.01)
*A01C 7/12* (2006.01)

(58) Field of Classification Search
USPC .................................................. 111/176, 185
See application file for complete search history.

(56) References Cited

U.S. PATENT DOCUMENTS

| | | | |
|---|---|---|---|
| 4,009,668 A | 3/1977 | Brass et al. | |
| 4,047,638 A | 9/1977 | Harrer et al. | |
| 6,516,733 B1* | 2/2003 | Sauder | A01C 21/005 |
| | | | 111/180 |
| 6,681,706 B2* | 1/2004 | Sauder | A01C 7/04 |
| | | | 111/171 |
| 7,185,596 B2* | 3/2007 | Thiemke | A01C 7/20 |
| | | | 111/185 |
| 7,918,168 B2* | 4/2011 | Garner | A01C 7/127 |
| | | | 111/171 |
| 8,418,634 B2* | 4/2013 | Shoup | A01C 7/046 |
| | | | 111/182 |
| 8,468,960 B2* | 6/2013 | Garner | A01C 7/20 |
| | | | 111/171 |
| 9,332,689 B2* | 5/2016 | Baurer | A01C 7/105 |
| 2016/0212932 A1* | 7/2016 | Radtke | A01C 7/046 |

* cited by examiner

SOWING MACHINE WITH A DISTRIBUTION BOX HAVING EJECTION POINT ADJACENT OPEN FURROW

BACKGROUND

The present invention relates to the general technical field of agricultural machinery. The invention concerns a single-seed sowing machine having a chassis that supports at least one sowing element provided with a distribution box, at least one opening disk making it possible to open a furrow in the soil and a depth-control wheel, wherein the said distribution box delivers the seeds one-by-one via a rotary dosing element designed to turn around an axis of rotation and each seed is ejected from the rotary dosing element at an ejection point extending into the lower part of the rotary dosing element.

In some known sowing machines of this type, the distribution box is positioned at the rear of a plow, which has the function of placing seeds in the furrow. This plow extends between and to the rear of a double disk for opening the furrow, and it keeps the furrow open until the seed is deposited therein. Control of the sowing depth is achieved by means of a depth-control wheel. The depth-control wheel is offset to the front or rear of the plow. Such a sowing element is supported on the soil via two contact points. The first contact on the soil is established by the depth-control wheel and the second via the plow. Each obstacle and/or irregularity of the soil therefore always results in two perturbations for the sowing element, since the support on the soil is established at the depth-control wheel and at the plow. The sowing precision is altered by these perturbations. Furthermore, the precision of sowing is also impaired by the fact of wear of the plow.

On other sowing machines, the distribution box is mounted above the double opening disk and a transfer means makes it possible to guide the seeds into the furrow as it is being formed. During sowing, only the depth-control wheels are in contact with the soil. With a single point of contact with the soil, the sowing quality achieved by each sowing element is optimum. On the other hand, such a configuration has a seed discharge approximately 50 cm above the soil, and so the seeds are guided by the transfer means. This large discharge height impairs the sowing precision. In general, the type and weight of the seeds modify the speed at which the seeds fall, because of the fact of the influence of gravity.

BRIEF SUMMARY

The object of the present invention is to remedy the aforesaid disadvantages. In particular, it is intended to provide a single-seed sowing machine with maximum sowing quality. The sowing precision should not be altered by the arrangement of the constitutive elements of the sowing element.

To this end, an important characteristic is that the said ejection point, as viewed along the axis of rotation of the rotary dosing element, is disposed in the outside diameter of the said opening disk. By virtue of this characteristic, the point of ejection or point of discharge of the seeds is situated relatively close to the soil and the seeds drop directly into the furrow while retaining the precision of the rotary dosing element. The acceleration of the speed of the seed due to the influence of gravity is somewhat limited.

According to another important characteristic, the ejection point, as viewed along the axis of rotation of the rotary dosing element, is disposed in the rearmost half of the opening disk. Such an arrangement of the rotary dosing element and of the opening disk contributes to achieving a relatively compact sowing element.

BRIEF DESCRIPTION OF THE DRAWINGS

Other characteristics and advantages of the invention will become apparent from the description hereinafter with respect to the attached drawings, which are provided only by way of non-limitative examples of the invention, and wherein.

DETAILED DESCRIPTION

Figure 1:
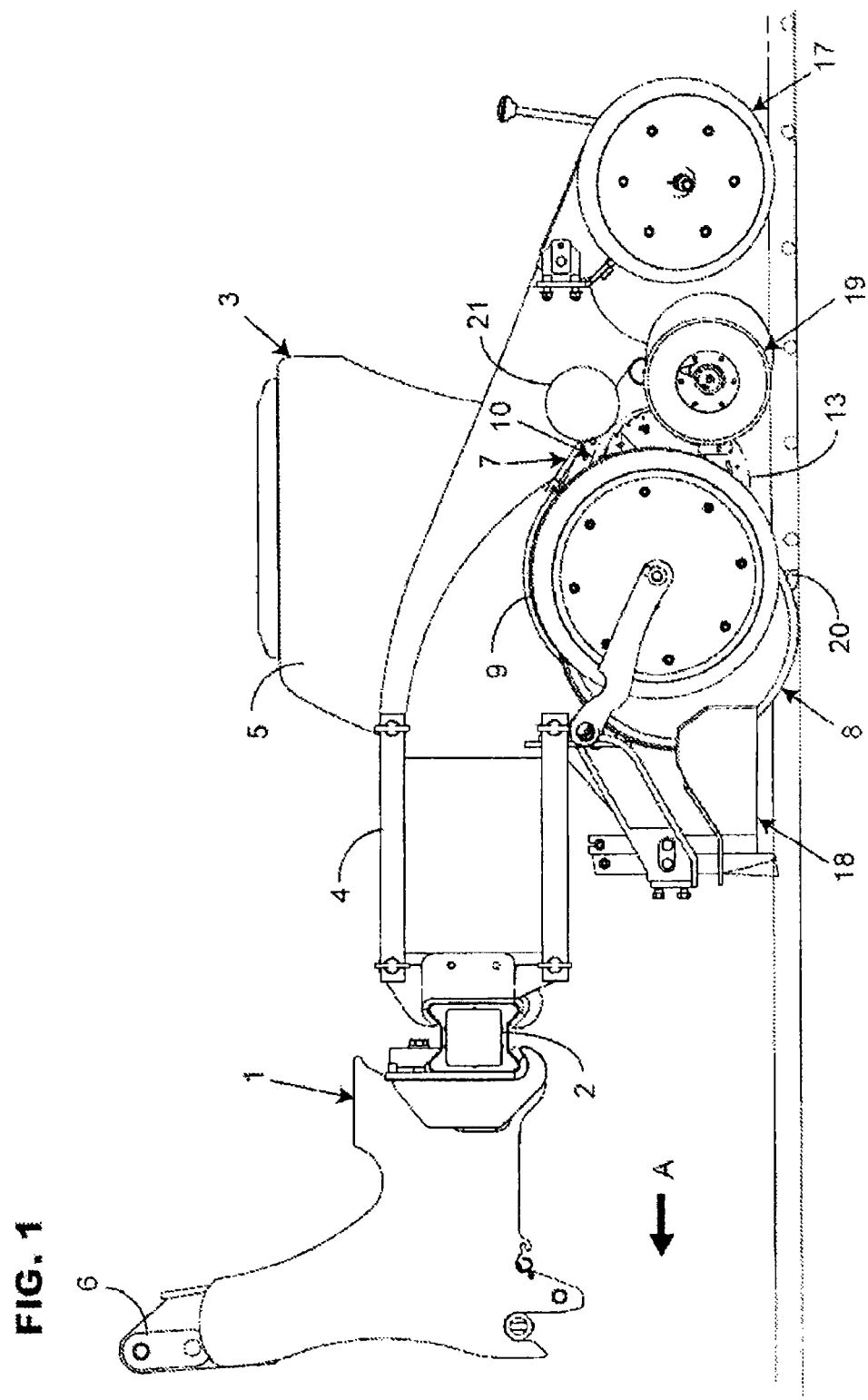
FIG. 1 illustrates a single-seed sowing machine according to the invention in a side view, FIG. 2 schematically represents a sowing element in side view.

The agricultural machine represented in FIG. 1 is a sowing machine (1). It is a precision or single-seed sowing machine (1) with pneumatic or mechanical distribution. Such a sowing machine (1) distributes the seeds one-by-one along the sowing line at constant spacing. This sowing machine (1) is provided with a chassis (2), which supports at least one sowing element (3) and which rests on the soil via support wheels during operation. Sowing elements (3) are positioned in regular manner on chassis (2). The number of sowing elements (3) corresponds to the number of sowing rows. Each sowing element (3) is mounted on chassis (2) by means of a deformable parallelogram (4), whereby it can be displaced parallel to the soil. Sowing machine (1) is also provided with at least one reservoir (5) for storing the seeds or the product to be sowed. In one exemplary embodiment, not illustrated, chassis (2) supports a central reservoir and each sowing element (3) possesses an auxiliary, remotely supplied reservoir. In this case, the capacity of the auxiliary reservoirs is small.

FIG. 1 is a side view of sowing machine (1) according to the invention in a working configuration. Chassis (2) is also provided with a coupling frame (6) making it possible to establish a connection to the hitch of a tractor (not illustrated). This three-point linkage makes it possible to transfer the weight and load of sowing machine (1) to the rear wheels of the tractor. The tractor tows sowing machine (1) in a forward direction indicated by arrow (A). In the rest of the description, the concepts of "front", "rear" and "in front of", "at the rear of" are defined relative to forward direction (A). Sowing element (3) is schematically represented in the figures. In particular, it is provided with a distribution box (7), an opening disk (8) and a depth-control wheel (9).

Distribution box (7) permits the extraction of seeds by means of a rotary dosing element (10). Rotary dosing element (10) is designed to turn around an axis of rotation (11). Each seed is ejected from rotary dosing element (10) at an ejection point (12), which extends into the lower part of rotary dosing element (10). Ejection point (12) is defined as being the point at which the seed is released, in other words the point at which the seed leaves rotary dosing element (10). Distribution box (7) is provided with a casing of general cylindrical shape and with a cover. Rotary dosing element (10) is mounted in the casing and is driven in rotation via drive elements according to the forward speed of sowing machine (1). In this way the distribution rate is adapted to the forward speed and the seeds are sowed at constant spacing.

In the illustrated example, distribution box (7) is a single-seed, vacuum-type distributor. This distributor extracts the seeds one-by-one from a reservoir (5) in order to spread them at constant spacing along the sowing row. Thus distribution box (7) comprises a seed-supply chamber, a suction chamber and a perforated disk (13) separating the two chambers. Perforated disk (13) can be considered as being a rotary dosing element (10). Perforated disk (13) is flat and turns around substantially horizontal axis of rotation (11). It has perforations disposed at regular intervals over a circumference close to its periphery. The perforations may be cylindrical or non-cylindrical holes or may have a shape that is open to the periphery of the disk. The seeds are taken up in the bottom of distribution box (7) and are discharged at ejection point (12) so as to drop into the furrow. The ejection point may be located on the circumference of perforated disk (13), in the lower part of perforated disk (13). The seeds are held for at least part of their angular displacement by suction via the perforation. One or more seeds is or are sucked by the vacuum, which presses the seeds against the perforations. During rotation, the seeds pass in front of a selector (14), which permits only one single seed per perforation. Such a vertical-disk distributor spreads the seeds at constant spacing along the sowing row, since the seeds leave rotary dosing element (10) and therefore distribution box (7) at regular intervals. The seeds are schematically represented in the figures and are placed at the bottom of the furrow made by opening disk (8). An ejector is able to facilitate detachment of the seeds to release the seeds, which drop into the furrow at ejection point (12). The vacuum air flow for selection of the seeds is produced by a turbine. Alternatively, seed selection is assisted by a pressure air flow.

Opening disk (8) creates a furrow with a specified depth where the seed will be placed and covered with earth. By virtue of an angle of attack, opening disk (8) cuts the soil by raising the soil on one side. Opening disk (8) is therefore oriented relative to the vertical. Opening disk (8) turns around a substantially horizontal axis of rotation (15). Axis of rotation (15) is advantageously inclined relative to the horizontal so that the seeds can be deposited at the bottom of the furrow. In this way the same opening disk (8) achieves opening and deposition of seeds in the furrow. To keep the furrow open and/or to assist the formation of the furrow, opening disk (8) is associated with a supplementary tool (22). Supplementary tool (22) is constructed in the form, for example, of a colter or disk.

Figure 2:
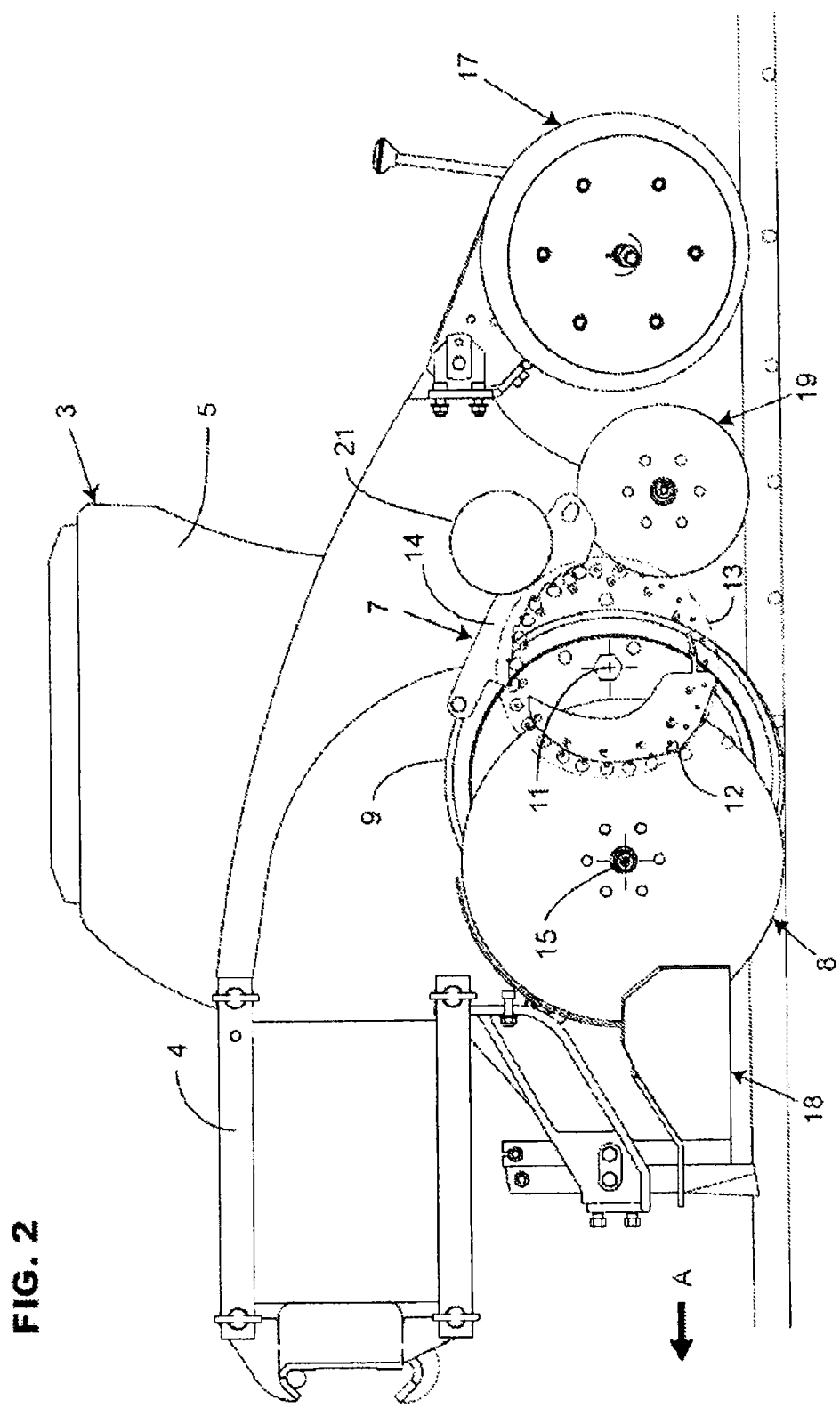
Figure 3:
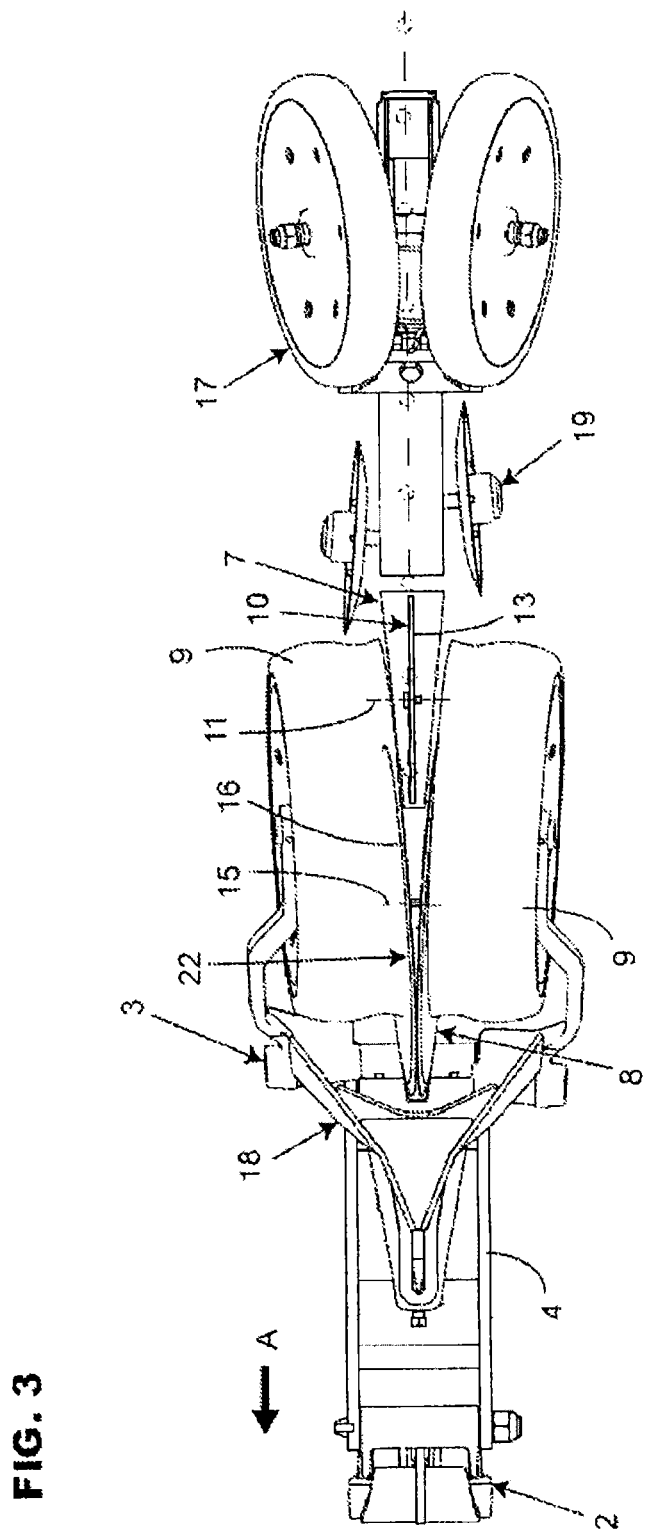
FIG. 3 is a view from underneath of the sowing element of FIG. 2.

In the example represented in FIGS. 1 to 3, opening disk (8) is associated with a supplementary tool (22) in the form of a disk (16). Opening disk (8) and disk (16) are disposed in V-shaped relationship, in such a way that the peripheries of the two disks (8 and 16) meet in the zone situated at the front. In this exemplary embodiment, sowing element (3) is therefore provided with a double opening disk. Such an arrangement is advantageous for excavating and shaping the furrow. Each disk (8, 16) extends in an oblique plane, oriented at an angle relative to an imaginary vertical plane containing forward direction (A). It will be noted that these disks (8, 16) have substantially identical outside diameters and may be of flat or concave shape. According to FIG. 3, it will be noted that the disks (8 and 16) are placed in such a manner that the opening of the furrow is symmetrical, since each of the disks (8 and 16) opens one side of the furrow. In some cases, it will be possible for the diameter of disk (16) to be smaller than that of opening disk (8).

The depth of the furrow excavated by opening disk (8) is controlled by virtue of depth-control wheel (9). Depth-control wheel (9) is positioned laterally on opening disk (8). Preferably, the lateral position of depth-control wheel (9) is such that its point of contact with the soil is aligned, in side view, with the place where the seed will drop. Depth-control wheel (9) is positioned at the point at which the gain drops into the furrow. In this way opening disk (8) is able to follow all the level changes of the soil without being thrown out of adjustment and to guarantee a regular sowing depth. A depth-control wheel (9) is also associated with disk (16). According to one alternative, not illustrated, opening disk (8) and disk (16) are offset from one another in forward direction (A) in order to facilitate formation of the furrow in soils without advance preparation of the soil or with simplified preparation. In this case, the rearmost disk, which terminates the furrow, must be considered for the positioning of rotary dosing element (10).

In the light of FIG. 1, sowing element (3) is equipped with a compacting element (17) disposed at the rear of opening disk (8). The function of this compacting element (17) is to compact and close the furrow. It returns earth onto the sowing line in order to favor contact between the seed and the soil and to favor germination of the seed. This compacting element (17) is a double wheel disposed in V-shaped relationship in order to compact the earth around the seed. Alternatively, the double wheel may be replaced by a single wheel of larger or smaller width. It will be noted that the illustrated sowing element (3) also supports a front device (18) and an intermediate device (19). As an example, front device (18) is a cleaning device for clearing away clods and/or debris from the sowing line. In turn, intermediate device (19) is disposed between opening disk (8) and compacting element (17). It is constituted by disks for assisting closing of the furrow or by a roller having the function of pressing the seed into the furrow before the furrow is closed.

According to an important characteristic of the invention, ejection point (12), viewed along axis of rotation (11) of rotary dosing element (10), is disposed in the outside diameter of opening disk (8). By virtue of this characteristic, seed-ejection point (12) is relatively close to the bottom of the furrow. The seeds drop directly into the furrow while retaining the precision imposed by rotary dosing element (10). The quality of sowing is therefore not altered by a transfer means or by gravitational acceleration. It will be noted that the diameter of rotary dosing element (10) is smaller than the outside diameter of opening disk (8) and that axis of rotation (11) of rotary dosing element (10) extends to the rear of axis of rotation (15) of opening disk (8). Axis of rotation (11) of rotary dosing element (10) extends substantially at the same level relative to the soil as axis of rotation (15) of opening disk (8). In the illustrated embodiment, axis of rotation (11) extends slightly above axis of rotation (15).

According to another characteristic, ejection point (12), viewed along axis of rotation (11) of rotary dosing element (10), is disposed in the rearmost half of opening disk (8). Such an arrangement of rotary dosing element (10) and of opening disk (8) contributes to obtaining a relatively compact sowing element (3). Advantageously, and as represented in FIG. 2, ejection point (12) is provided in the lower quarter and in front of distribution box (7) or of rotary dosing element (10). Ejection point (12) extends substantially below and to the rear of axis of rotation (15) of opening disk (8). In this way discharge of the seeds takes place at a relatively low height above the soil and the seed falls to earth as soon as the furrow is started by opening disk (8). A seed-transfer chute is therefore not necessary. This height ranges between 3 and 20 cm. Opening disk (8) is provided with a shield (20), the function of which is to protect the distribution and trajectory of the seed. Shield (20) also assists in formation of the bottom of the furrow. The distance between the bottom of the furrow and ejection point (12) is smaller than the radius of opening disk (8). This distribution therefore obviates the need for a transfer means and a plow to keep the furrow open.

Particularly advantageously, the height of mounting of distribution box (7) on sowing element (3) is adjustable. This adjustment makes it possible to adapt the position of distribution box (7) relative to opening disk (8). The adjustment makes it possible in particular to position rotary dosing element (10) and more precisely to position ejection point (12) according to the working conditions. Preferably ejection point (12) is positioned so as to be as low as possible, in other words as close as possible to the bottom of the furrow. This adjustment is made according to the type of seeds to be sowed, of the sowing depth, of the type of soil and of the presence of stones or of vegetable debris. The height position of axis of rotation (11) of rotary dosing element (10) is adjustable relative to axis of rotation (15) of opening disk (8). The adjustable distance between the bottom of the furrow and ejection point (12) ranges between 3 and 20 cm.

The seed ejected from distribution box (7) is deposited in the furrow as soon as the bottom of the furrow created by opening disk (8) is formed. The seed is deposited substantially close to the point of support of depth-control wheel (9) on the soil. The sowing depth is therefore regular, since the offset between the seed discharge and depth-control wheel (9) in forward direction (A) is minimum. In the light of FIG. 3, it will be noted that the front part of distribution box (7) is conformed to be positioned between opening disk (8) and supplementary tool (22) embodied by disk (16). The front part is tapered so that it can fit between the disks disposed in V-shaped relationship. In this way the seeds are deposited as soon as the furrow is formed. The formation of the furrow takes place substantially in the vertical through axis of rotation (15) of opening disk (8). Ejection point (12), viewed in forward direction (A), is therefore positioned in such a way that it is as close as possible to axis of rotation (15). The space requirements of opening disk (8) and distribution box (7) in height and length are therefore reduced. In order to permit replacement of perforated disk (13) and emptying of the seeds, distribution box (7) can be demounted easily and quickly.

According to another advantage, drive (21) of rotary dosing element (10) is off-centered relative to its axis of rotation (11). Drive (21) is positioned directly above rotary dosing element (10). In the illustrated example, the driving of rotary dosing element (10) or of perforated disk (13) takes place on its periphery. Drive (21) is achieved by an electric motor, by pinions controlling the distribution box via a chain or by bevel gears controlling the distribution box via a cardan shaft.

Figure 4:
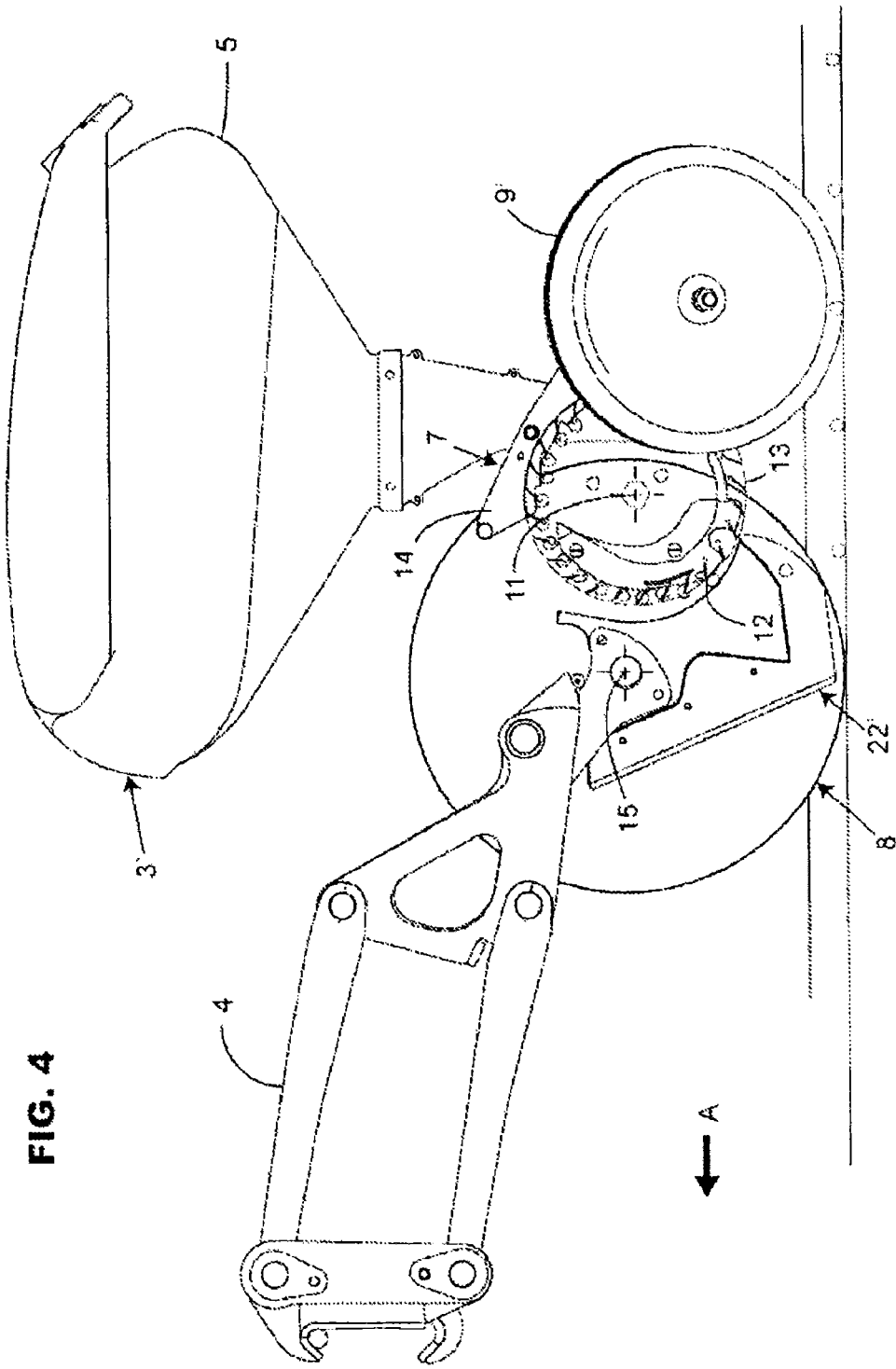
FIG. 4 represents a side view of a sowing element according to another exemplary embodiment.

FIG. 4 represents a sowing element (3') according to another exemplary embodiment. This sowing element (3') is identical to sowing element (3) of FIGS. 1 to 3 with the exception of supplementary tool (22') associated with opening disk (8) and of the position of depth-control wheel (9'). Supplementary tool (22') is constituted by a colter. This colter is mounted in fixed relationship as represented or else is mounted in rotary relationship. Sowing element (3') is equipped with a single opening disk (8). The angle of attack of opening disk (8) is therefore larger. The angle of attack is such that the opening of the furrow is quite wide. The colter participates in keeping the furrow open to deposit the seeds. The position of the colter is such that it does not participate in opening of the furrow. Depth-control wheel (9') advantageously extends to the rear of opening disk (8). It makes it possible on the one hand to control the sowing depth and on the other hand to compact and close the furrow. This sowing element (3') is not provided with compacting element (17).

According to one exemplary embodiment, not illustrated, the depth-control wheel extends in front of opening disk (8).

It is quite evident that the invention is not limited to the embodiments described hereinabove and presented in the attached drawings. Modifications are still possible, especially as regards the constitution or the number of the diverse elements, or by substitution of technical equivalents, albeit without going beyond the scope of protection as defined by the claims hereinafter.

The invention claimed is:

1. A single-seed sowing machine comprising:
   a chassis that supports at least one sowing element including a distribution box;
   at least one opening disk making it possible to open a furrow in the soil;
   a depth-control wheel; and
   a rotary dosing element positioned within the distribution box to pick up seeds from the distribution box, the rotary dosing element being configured to turn around an axis of rotation while holding the seeds via suction,
   wherein each of the seeds is ejected from the rotary dosing element at an ejection point extending into a lower part of the rotary dosing element;
   wherein the ejection point, as viewed along the axis of rotation of the rotary dosing element, is disposed within a diameter of the opening disk,
   wherein the depth-control wheel is positioned laterally on the opening disk, and
   wherein the distribution box is tapered such that a front part of the distribution box has a width that is less than a width of the rear part of the distribution box.

2. A sowing machine according to claim 1, wherein the ejection point, as viewed along the axis of rotation of the rotary dosing element, is disposed in a rearmost half of the opening disk.

3. A sowing machine according to claim 1, wherein the ejection point is provided in a lower quarter and in front of the distribution box and extends substantially below and to a rear of the axis of rotation of the opening disk.

4. A sowing machine according to claim 1, wherein the furrow is excavated by the opening disk and a depth of the furrow is controlled by the depth-control wheel.

5. A sowing machine according to claim 1, wherein each of the seeds ejected from the rotary dosing element is deposited in the furrow close to a point of support of the depth-control wheel on the soil.

6. A sowing machine according to claim 1, wherein the diameter of the rotary dosing element is smaller than the diameter of the opening disk.

7. A sowing machine according to claim 1, wherein the opening disk has an angle of attack for opening a furrow and formation of the furrow is completed by a supplementary tool.

8. A sowing machine according to claim 7, wherein the front part of the distribution box is conformed to be positioned between the opening disk and the supplementary tool.

9. A sowing machine according to claim 1, wherein the sowing element is not provided with a transfer chute for the seeds.

10. A sowing machine according to claim 1, wherein a drive of the rotary dosing element is off-centered relative to an axis of rotation of the rotary dosing element.

11. A sowing machine according to claim 1, wherein the sowing element includes a double opening disk.

12. A sowing machine according to claim 1, wherein each of the seeds is ejected from the rotary dosing element at a point at which each of the seeds leaves the rotary dosing element.

13. A sowing machine according to claim 1, wherein the rotary dosing element is a perforated disk that holds one of the seeds at each perforation via suction.

14. A sowing machine according to claim 13, wherein each of the seeds is ejected from the rotary dosing element at a point at which each of the seeds leaves the perforated disk.

15. A sowing machine according to claim 1, wherein the depth-control wheel is positioned such that, as viewed along an axis of rotation of the depth-control wheel, a point of contact of the depth-control wheel is aligned laterally with where each of the seeds will drop.

16. A sowing machine according to claim 1, wherein an axis of rotation of the depth-control wheel is positioned longitudinally in front of the axis of rotation of the rotary dosing element.

\* \* \* \* \*